(12) United States Patent
Shaw

(10) Patent No.: US 6,772,947 B2
(45) Date of Patent: Aug. 10, 2004

(54) XML-BASED BARCODE SCANNER

(75) Inventor: Elizabeth C. Shaw, Scotts Valley, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/429,053

(22) Filed: May 2, 2003

(65) Prior Publication Data

US 2003/0197062 A1 Oct. 23, 2003

Related U.S. Application Data

(63) Continuation of application No. 09/677,157, filed on Oct. 2, 2000, now Pat. No. 6,568,596.

(51) Int. Cl.[7] .............................. G06K 7/10; G06F 17/60
(52) U.S. Cl. ............................ 235/462.01; 235/462.07; 235/385; 235/384
(58) Field of Search ....................... 235/462.07, 462.01, 235/487, 383, 385, 379, 380, 494, 376; 705/404; 715/513

(56) References Cited

U.S. PATENT DOCUMENTS

| | | | |
|---|---|---|---|
| 4,476,381 A | 10/1984 | Rubin | 235/375 |
| 4,835,372 A | 5/1989 | Gombrich et al. | 235/375 |
| 4,988,852 A | 1/1991 | Krishnan | 235/462 |
| 5,153,416 A | 10/1992 | Neeley | 235/375 |
| 5,189,291 A | 2/1993 | Siemiatkowski | 235/472 |
| 5,193,855 A | 3/1993 | Shamos | 283/117 |
| 5,288,977 A | 2/1994 | Amendolia et al. | 235/375 |
| 5,465,082 A | 11/1995 | Chaco | 340/825.54 |
| 5,786,582 A | 7/1998 | Roustaei et al. | 235/462 |
| 5,822,544 A | 10/1998 | Chaco et al. | 395/202 |
| 5,865,745 A | 2/1999 | Schmitt et al. | 600/407 |
| 5,913,210 A | 6/1999 | Call | 707/4 |
| 5,933,829 A | 8/1999 | Durst et al. | 707/10 |
| 5,992,752 A | 11/1999 | Wilz, Sr. et al. | 235/472.01 |
| 6,012,102 A | 1/2000 | Shachar | 710/5 |
| 6,045,040 A | 4/2000 | Streicher et al. | 235/381 |
| 6,076,733 A | 6/2000 | Wilz, Sr. et al. | 235/462.01 |
| 6,088,695 A | 7/2000 | Kara | 707/10 |
| 6,108,656 A | 8/2000 | Durst et al. | 707/10 |
| 6,112,986 A | 9/2000 | Berger et al. | 235/380 |
| 6,152,369 A | 11/2000 | Wilz, Sr. et al. | 235/462.01 |
| 6,154,738 A | 11/2000 | Call | 707/4 |
| 6,219,587 B1 | 4/2001 | Ahlin et al. | 700/233 |
| 6,255,951 B1 | 7/2001 | De La Huerga | 340/573.1 |
| 6,260,761 B1 | 7/2001 | Peoples, Jr. | 235/462.07 |
| 6,289,501 B1 | 9/2001 | Mutschler, III | 717/1 |
| 6,305,605 B1 | 10/2001 | Goetz et al. | 235/385 |
| 6,356,923 B1 * | 3/2002 | Yano et al. | 717/127 |
| 6,504,554 B1 * | 1/2003 | Stone et al. | 345/760 |
| 6,519,617 B1 * | 2/2003 | Wanderski et al. | 715/513 |
| 6,565,609 B1 * | 5/2003 | Sorge et al. | 715/503 |
| 6,568,596 B1 * | 5/2003 | Shaw | 235/462.01 |
| 6,636,831 B1 * | 10/2003 | Profit et al. | 704/275 |

FOREIGN PATENT DOCUMENTS

| | | | |
|---|---|---|---|
| EP | 0 837 406 A2 | 4/1998 | G06F/17/30 |
| JP | 407064964 A | 3/1995 | G06F/17/00 |
| JP | 202103746 A * | 4/2002 | B41J/29/38 |
| WO | WO 98/06055 | 2/1998 | G06F/163/00 |
| WO | WO 99/15990 | 4/1999 | G06F/163/00 |

OTHER PUBLICATIONS

Tim Bray et al., "Extensible Markup Language (XML) 1.0," W3C Recommendation, Feb. 10, 1998, pp. 1–32.

* cited by examiner

Primary Examiner—Karl D. Frech
Assistant Examiner—Daniel Walsh
(74) Attorney, Agent, or Firm—Fish & Neave; Joel Weiss; Andrew Van Court

(57) ABSTRACT

A method and system for scanning bar code data that can be published in near real time on Internet or intranet sites. The format is preferably XML-based, so the data is ready for e-commerce applications without further manipulation or conversion. The data can also be translated to more traditional bar code formats for backward compatibility with established barcode scanning practices.

10 Claims, 5 Drawing Sheets

XML-BASED BARCODE SCANNER

This is a continuation of U.S. patent application Ser. No. 09/677,157, filed Oct. 2, 2000 U.S. Pat. No. 6,568,596, which is hereby incorporated by reference in its entirety.

BACKGROUND OF THE INVENTION

The present invention relates to the field of data collection for use in logistics, manufacturing, health care, warehouses, education, or any other business that uses bar codes.

Existing bar code scanning involves discrete stages of data collection and data manipulation before publication. Even after publication, however, the data is generally not in a format that is easily published on the Internet or used by e-commerce applications.

Therefore, it would be desirable to convert bar code data into data that is easily published on the Internet or used by e-commerce applications.

SUMMARY OF THE INVENTION

It is an object of the invention to convert bar code data into data that is easily published on the Internet or used by e-commerce applications.

Methods and systems for converting a bar code into a markup language document, the method including scanning a bar code to generate bar code data and preparing the markup language document using the bar code data are provided.

BRIEF DESCRIPTION OF DRAWINGS

The above and other objects and advantages of the invention will be apparent upon consideration of the following detailed description, taken in conjunction with the accompanying drawings, in which like reference characters refer to like parts throughout.

DETAILED DESCRIPTION OF THE INVENTION

Figure 1:
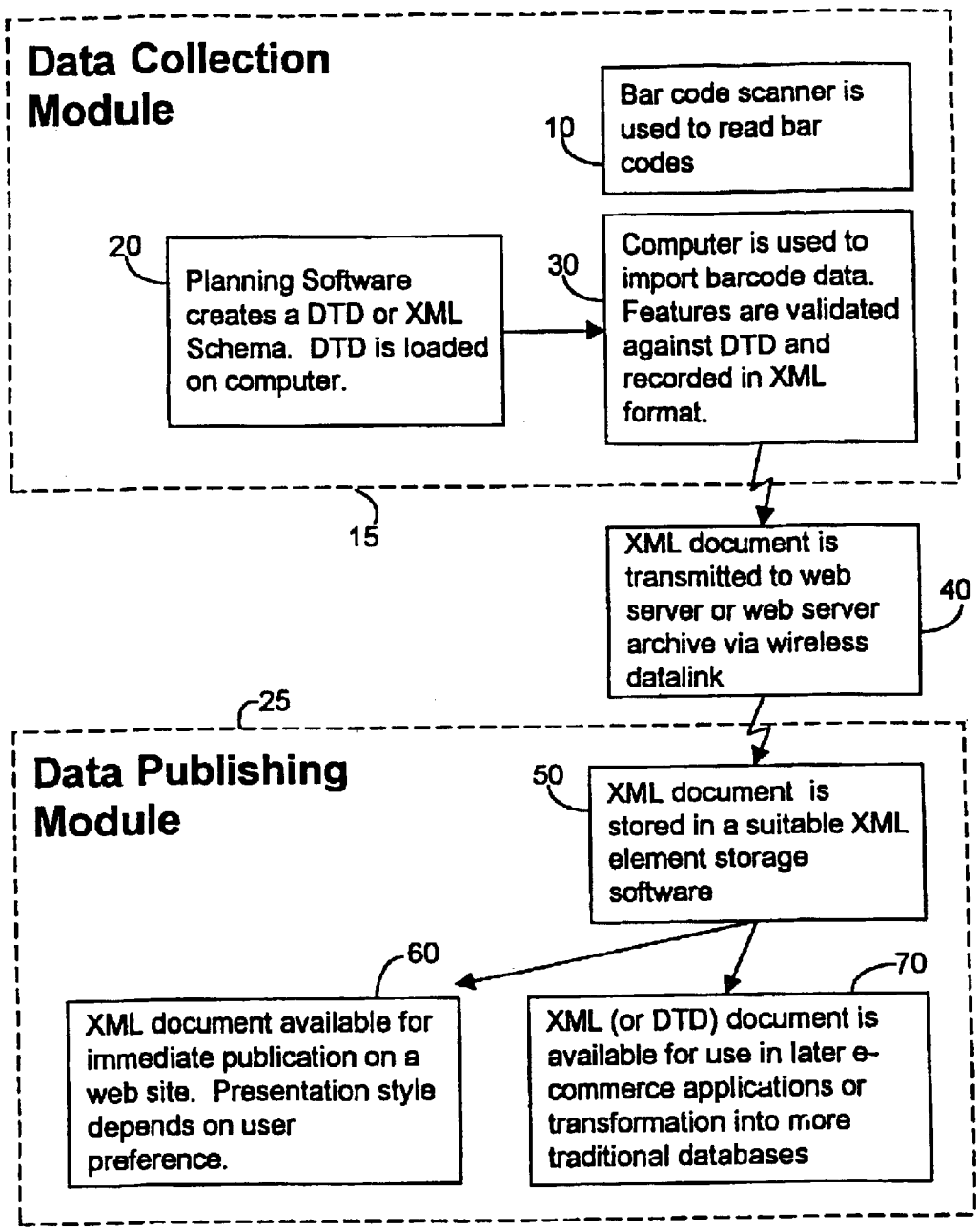
FIG. 1 is a flow chart of a preferred method according to the present invention.

A general description of bar code scanning and its relation to systems and methods according to the invention follows. One dimensional bar code scanning involves scanning the pattern of wide and narrow bars, looking up the "code" in a database, and then using the results in an application. Two-dimensional bar code scanning involves scanning the square or rectangular patters that encode data in two dimensions then using the results in an application.

Each bar code feature requires a data type to define its extent and also a set of feature descriptors called attributes. Attributes might be of nearly any data type such as text, numeric, or binary. The attributes provide the basis for interpreting the features. The applications for a barcode database are as diverse as health care management to inventory control.

One-dimensional bar codes provide data that is limited to a small number of alphanumeric characters. There are several industry standards and conventions for converting the bar code into data to choose from, depending on the application. Encoding information about the bar coded item is typically the responsibility of the database designer.

For two-dimensional barcodes, more data is available for scanning. However, publishing the data on the Internet in a globally standard format presents a difficult problem. The receiving application has to be able to interpret the 2D-scanned data and then present it to the user.

The present invention preferably allows the data collector to collect the data in XML-format, as will be explained below. (For the purposes of this application, Extensible Markup Language (XML) is referred to because it is the preferred language. However, it should be understood that any other suitable markup language may also be used, and this application is not limited specifically to the use of XML language. The W3C Recommendation of Feb. 10, 1998 Extensible Markup Language (XML) 1.0 is hereby incorporated by reference herein in its entirety.) This data collection scheme allows the data to be published on the Internet, or other suitable network, in an Internet-business related format virtually seconds after the data is collected.

In an embodiment of data collection according to the invention, upon the completion of the entry of attribute data, the features may be uploaded with a wireless link, or other suitable communications link, to an Internet server for immediate publication on a Web site. Data can be streamed to the Internet server if desired—i.e., data can be viewed on the Internet rather than waiting for the end of data collection.

The style of presentation of the data is preferably up to the Web application manager since the XML format separates the display of an XML document from its content. The features can be published as spreadsheet data, interactive business forms or perhaps as charts that could trigger automatic re-order of inventory. Because of the XML format, the end user of the data—e.g., the viewer of the website—is also not constrained by the display choices of the web application manager. An end user with a large monitor may choose a graphic display while a viewer with a small screen on a cell phone may be simultaneously viewing the same site as text.

Three applications of how the present invention may be used follow:

EXAMPLE 1

Hospital Management

A hospital manages patient information, patient care, hospital equipment and supplies, and patient insurance communication.

In a method of managing information according to the invention, when patients are admitted to the hospital, they are assigned an XML-tagged bar code containing information about their medical history, hospital care needed, and insurance. This information may then be relayed to the insurance company and regular updates are relayed, as needed.

In one embodiment of the invention, medical claims personnel at the insurance company can use the Internet to view and process the patient information. During the hospital stay, information about the medications and hospital procedures are added to the patient's records by scanning the XML-tagged bar codes and sending the information to the hospital's computer. Periodically, the hospital computer may contact the drug suppliers for additional inventory or equipment servicing (like calibration).

EXAMPLE 2

Inventory Management

A computer and peripheral manufacturing company endeavors to deliver assembled products more quickly and efficiently. One obstacle to the quick and efficient delivery of assembled products is the fact that many of their products can be customized. These customized products often require different parts. It would be beneficial to accurately predict the delivery schedule of the different parts and to be able to quickly detect any supplier problems.

The different suppliers may scan the XML-tagged bar codes on their computer parts when they leave the assembly line and the information about inventories, availability, technical specifications, etc., may be immediately available on the company website. The computer manufacturer may have its computers regularly query the supplier databases preferably using XML Linking Language (XLink) (as noted above, any suitable linking language may be used for this purpose). The queries could be for standard configurations, large orders of unusual configurations, and any other ordering scenario. The computer manufacturer's computers could then use the results to order the necessary supplies, direct the shipment to its factory, then pass on the information to the accounting and order processing departments, again, using XLink.

EXAMPLE 3

Information Distribution

Typically, a national rental car company monitors their vehicle inventory and all the information related to each individual vehicle. Generally, different departments within the rental car company obtain selected portions of this information and present it in a way that is effective for their department.

In one embodiment of a method according to the invention, a 2-dimensional XML-tagged bar code may preferably be created for each car, containing technical specifications, a digital image, rental history, service history or other relevant information. Because information and presentation rules are separate for XML, the users can manipulate information locally by importing it into their applications from the web browser. Other software applications can then directly access the information.

In addition to the methods described in the preceding examples, one further aspect of the present invention is directed to a method of collecting the feature data in XML format. This aspect includes assembling information about the feature name and type, and the related attribute information. A user interface for accomplishing this task is also preferably provided. Other aspects of the present invention are directed to a method for uploading the feature data to a server and for publication of the data.

The present invention also is directed to the fact that bar code features can be collected in XML format. In the description below, 'features' are referred to as 'parent elements' for consistency with XML specification usage.

FIG. 1 is a block diagram of a preferred embodiment of a method according to the present invention. In this embodiment, there is a Data Collection Module 15 and a subsequent Data Publishing Module 25. A computer 30, or other suitable device, is used to create, or import, a data collection definition (DTD) or Schema 20. A DTD is a program for guiding collection of element and attribute data that is guided by the DTD and substantially invisibly merging bar code data as attributes or child elements of the parent element being captured. The result of the merge is an XML document that has already been validated against the DTD.

Then, parent elements (with child elements or attributes) are recorded in XML format. The XML documents are transmitted via a wired or wireless link 40 to an XML element storage system. This system may preferably be on a web server 50. The XML documents are available for immediate publication on the web 60 or for later re-use 70.

The data collection task may be separated in both time and space from the data-publishing task. In this embodiment the two are linked via a wireless connection that reduces the time and distance between the tasks. It should be understood that other methods of communication between the modules might be used as well. These other methods may be via a hard-wired modem connection or via a serial cable and the like.

Figure 2:
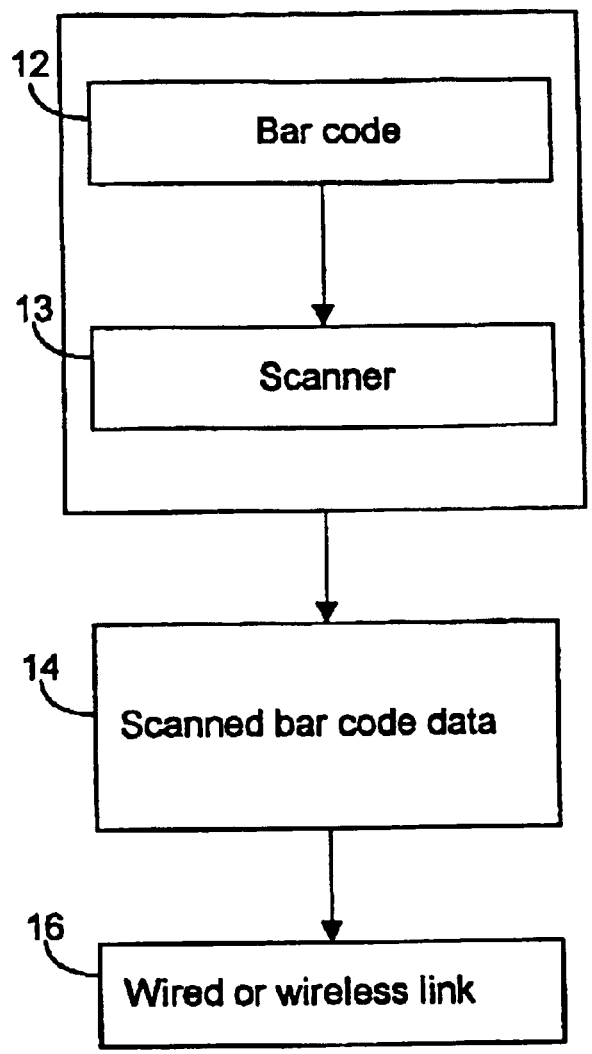
FIG. 2 is a flow chart of the operation of a conventional bar code scanner.

A preferred embodiment of this invention is to acquire bar code data from a bar code scanner. FIG. 2 is a flow chart of the operation of a conventional bar code scanner. Bar codes 12 can be of various types, depending on the application of the data they encode. Some industry recognized bar code types are:

Numeric-Only

EAN-13
EAN-8
UPC-A
UPC-E
Code 11
Interleaved 2 of 5
Industrial 2 of 5
Standard 2 of 5
Codabar
Plessey
MSI
PostNet Alphanumeric Code 39
Code 93
Code 128
LOGMARS 2-Dimensional PDF417
DataMatrix
Maxicode
QR Code
Data Code
Code 49
16K The bar code scanner 13 can be of any model or manufacture that outputs bar code data 14 according to industry standards. The scanned data is transmitted to the computer via a wired or wireless link 16.

For both one- and two-dimensional bar codes, the supported data types are: bytes, ASCII characters, and numeric digits. PDF417 data types also include graphics and sound.

Figure 3:
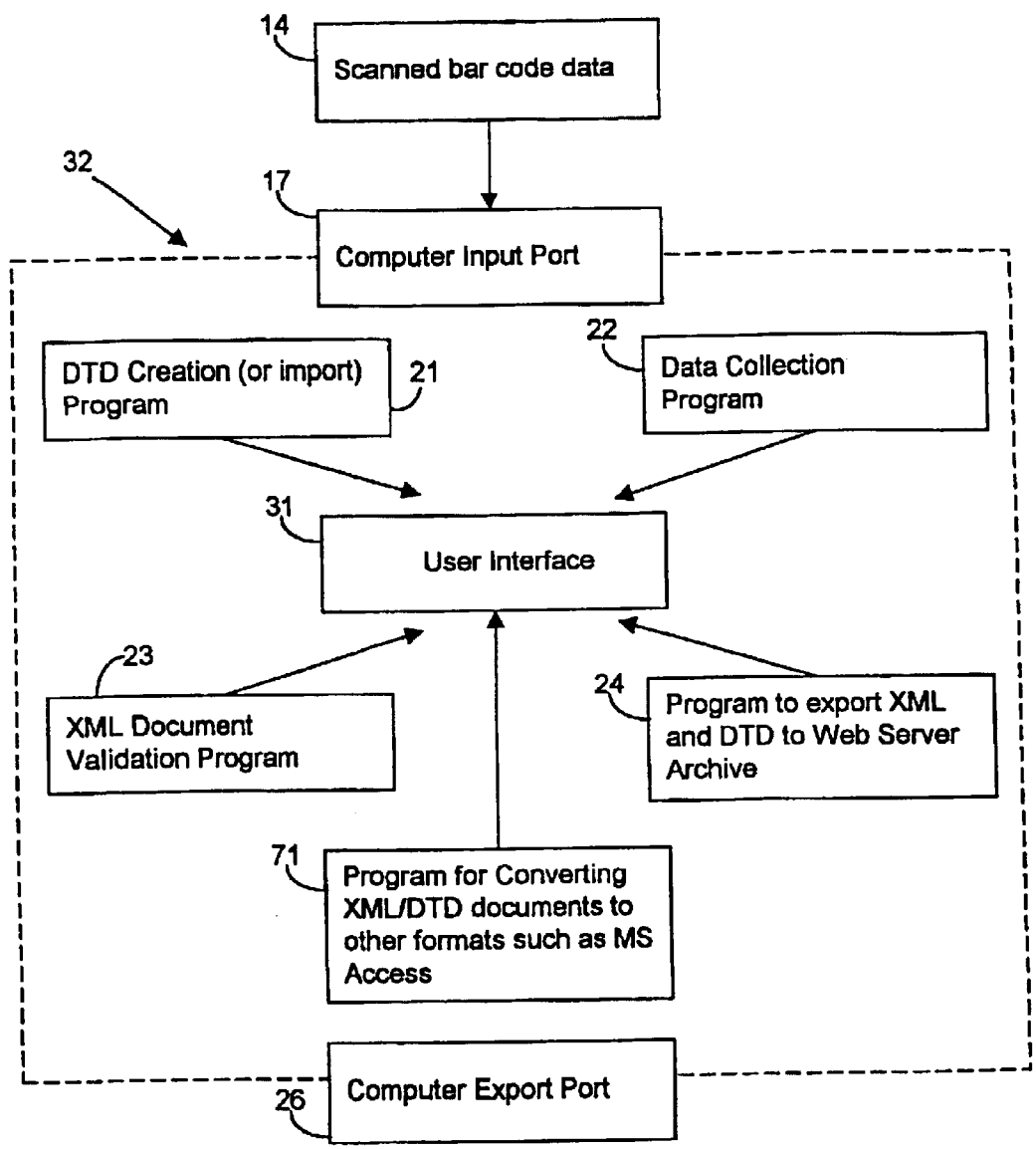
FIG. 3 is a block diagram showing an embodiment of a system according to the invention.

FIG. 3 provides details of the programs available on a system 32 according to the invention.

A user interface 31 manages the user interaction for a number of tasks. A program is provided for the creation of the DTD or Schema 21, the collection of data 22, and the export of the resultant documents 24.

The DTD lays out the rules for how to create or read an XML document. A preferred version of the DTD is the XML Schema and is also suitable for this embodiment.

The DTD describes data elements. These elements can contain a wide variety of attributes and/or child elements in accordance with the XML specification. System 12 includes a software program that provides the user with a simple way to create DTD's that conform to the complicated XML specification. The DTD can be considered as a statement of the data capture objectives. An example of a DTD for the collection of child element data for a parent element is provided below.

```
<!ELEMENT Features (Feature Name, VIN, Color, Make,
    Model, Year, Registered-Owner)>
<!ELEMENT Feature-Name (#PCDATA)>
<!ELEMENT VIN (#PCDATA)>
<!ELEMENT Color (#PCDATA)>
<!ELEMENT Make (#PCDATA)>
<!ELEMENT Model (#PCDATA)>
<!ELEMENT Registered Owner (#PCDATA)>
```

The present invention allows the user to specify a number of options in the creation of a DTD. For example, a more sophisticated version of the same DTD would appear with descriptions of the type of entry that is available for each element.

```
<!ELEMENT Features (FeatureName, VIN, VINLabel,
    Color, Make, MakeLabel, Model, ModelLabel, Year,
    Registeredowner, RegisteredOwnerLabel)>
<!ELEMENT FeatureName (#PCDATA)>
<!ATTLIST FeatureName e-dtype NMTOKEN #FIXED
    'string'>
<!ELEMENT VIN (#PCDATA)>
<!ATTLIST VIN e-dtype NMTOKEN #FIXED 'string'>
<!ELEMENT VINLabel (#PCDATA)>
<!ATTLIST VINLabel e-dtype NMTOKEN #FIXED
    'string'>
<!ELEMENT Color (#PCDATA)>
<!ATTLIST Color e-dtype NMTOKEN #FIXED 'string'>
<!ELEMENT Make (#PCDATA)>
<!ATTLIST Make e-dtype NMTOKEN #FIXED 'string'>
<!ELEMENT MakeLabel (#PCDATA)>
<!ATTLIST MakeLabel e-dtype NMTOKEN #FIXED
    'string'>
<!ELEMENT Model (#PCDATA)>
<!ATTLIST Model e-dtype NMTOKEN #FIXED 'string'>
<!ELEMENT ModelLabel (#PCDATA)>
<!ATTLIST ModelLabel e-dtype NMTOKEN #FIXED
    'string'>
<!ELEMENT Year (#PCDATA)>
<!ATTLIST Year e-dtype NMTOKEN #FIXED 'string'>
<!ELEMENT RegisteredOwner (#PCDATA)>
<!ATTLIST RegisteredOwner e-dtype NMTOKEN
    #FIXED 'string'>
<!ELEMENT RegisteredOwnerLabel (#PCDATA)>
<!ATTLIST RegisteredownerLabel e-dtype NMTOKEN
    #FIXED 'string'>
```

When the bar code data is mixed with the attribute information or child elements observed by the data collector, the result is an XML document. Since the program user interface is guided by the DTD, the user is not allowed to collect information that will produce an XML document that is not valid when compared to the DTD. An example of an XML document that has merged both bar code data and attribute data expressed as child elements is shown below.

```
<?xml version="1.0"?>
<!DOCTYPE Features SYSTEM "C:\features.dtd">
<Features><!--(Feature Name, VIN, VIN Label, Color,
    Make, Make Label, Model, Model Label, Year, Regis-
    tered Owner, Registered Owner Label)-->
    <Feature Name>Automobile</Feature Name>
    <VIN>1122334455</VIN>
    <VIN Label>VIN</VIN>
    <Color>red</Color>
    <Make>Honda</Make>
    <Make Label>Make</Make Label>
    <Model>Accord</Model>
    <Model Label>Model</Model Label>
    <Year>2000</Year>
    <Registered Owner>Jane Doe</Registered Owner>
    <Registered Owner Label>Registered
Owner</Registered Owner Label>
</Features>
```

An alternative embodiment of this invention would be to collect the bar code data in a separate file and to reference that file from within the XML document.

The result of the Data Collection Module shown in FIG. 1, which preferably incorporates DTD 21, Data Collection Program 22 and bar code data 14 shown in FIG. 2, is a finished XML document. The XML document is already validated against the DTD or Schema via a validation program on the computer 23. The validation serves as an error check that data that the document that is to be delivered to the web server is in the proper format and will not cause problems later.

A final program is a utility 71 for converting XML documents to other database formats such as Microsoft Access 71.

At this point, the XML document is ready for web publication or, alternatively, to be archived. A program is provided on the computer 24 to manage the export of XML and DTD (or Schema) documents. The collected data is exported via a port in the computer 26.

Figure 4:
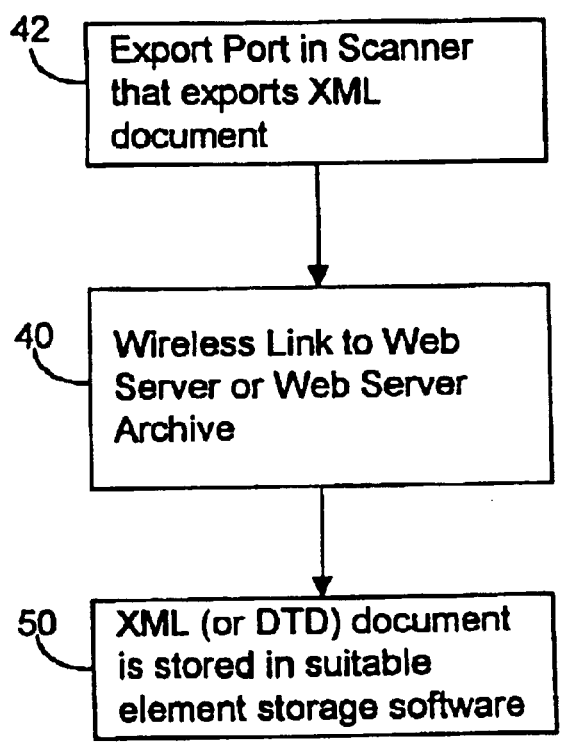
FIG. 4 is a block diagram of a flow chart according to the invention.

FIG. 4 is a flow chart which describes the link (corresponding to element 40 in FIG. 1) between the field data collection module and the data publishing module. The export port in the scanner exports the XML document 42. A wireless link 40 provides a convenient method of sending the document to the XML or DTD Document Storage archive 50. For large data collection projects, the XML document can be streamed to the web server. The present invention can accommodate any method of linking the document to the web server archive.

Figure 5:
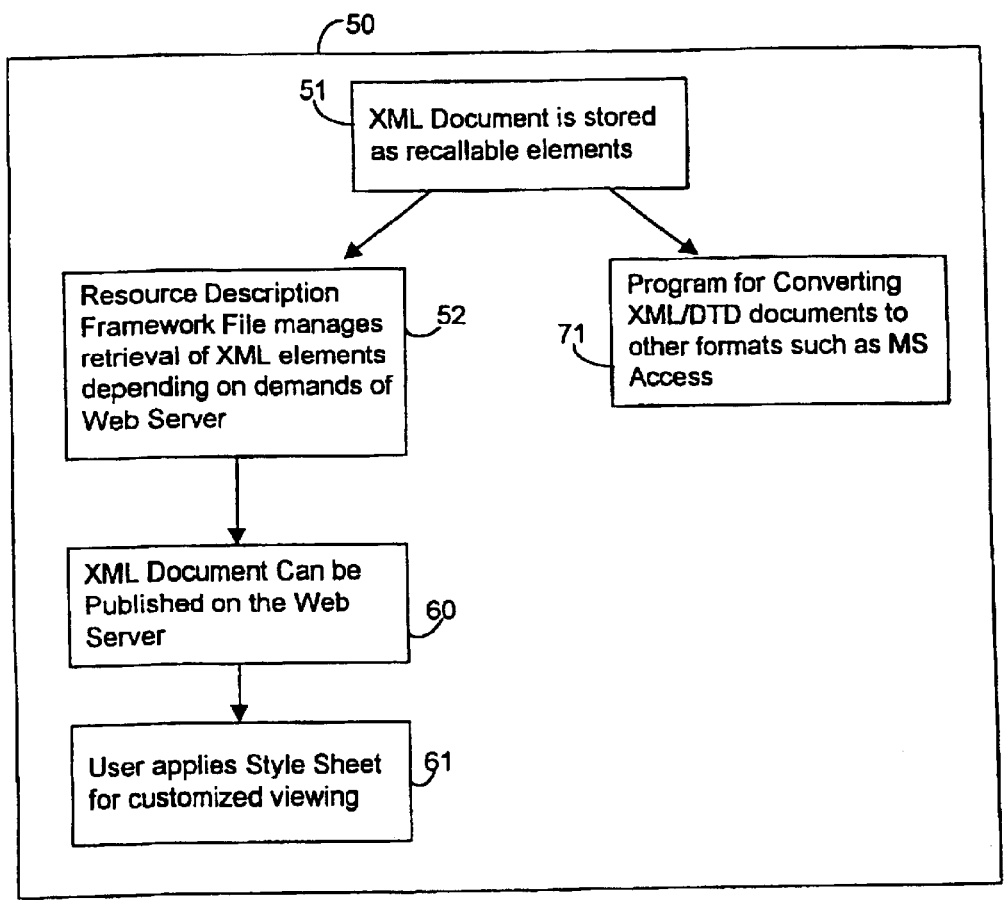
FIG. 5 is a block diagram showing document storage according to the invention.

FIG. 5 describes a method of document storage and publication according to the invention. Thus, FIG. 5 shows the data publication module 25 of FIG. 1, greater detail. The XML or DTD document is stored on the web server as a recallable set of elements 51. The XML document can be dynamically presented to the web or archived in a suitable document database. It should be noted that it is the document elements and the corresponding DTD or Schema that is being archived, not traditional database tables and records. The document can be efficiently stored in parts (elements) because the DTD or Schema provides the guide for reassembly.

Commercial components for the archival and retrieval of XML documents are readily available and function similar to the Inso Dynabase Web Manager. The Inso Corporation is headquartered in Boston, Mass. The Dynabase Web Manager is an XML-based content management, automated production and personalized information delivery solution for constructing advanced business-to-business and business-to-consumer applications.

This embodiment allows the end viewer of the data to provide a custom style sheet that allows unique display or download of XML elements depending on the viewer's personal preference 61. The format and syntax for Cascading Style Sheets (CSS) is defined in User Interface for CSS3 W3C Working Draft 16 Feb 2000 of the World Wide Web Consortium (see http://www.w3.org/TR/2000/WD-css3-userint-20000216.html) which is hereby incorporated by reference herein in its entirety. For Extensible Stylesheet Language (XSL) see http://www.w3.org/TRJ2000/WD-xsl20000327 which is hereby incorporated by reference herein in its entirety.

The present invention is compatible with traditional database programs because the DTD and XML documents contain all of the information needed to recreate the data in whichever format is desired. The invention provides a program with a user interface that guides the user through the process of converting the DTD and XML documents to other standard database formats such as Microsoft Access 70.

Thus, systems and methods relating to scanning a bar code to provide bar code data, and converting Persons skilled in the art will appreciate that the present invention can be practiced by other than the described embodiments, which are presented for purposes of illustration rather than of limitation, and the present invention is limited only by the claims which follow.

What is claimed is:

1. A method for tracking a vehicle inventory, the method comprising:

providing each vehicle with a two-dimensional markup language-tagged bar code, the bar code including vehicle information;

scanning the bar code to generate bar code data;

preparing a markup language document using the bar code data; and creating an XML schema to guide collecting of element data and attribute data for use in the markup language document.

2. The method of claim 1 further comprising converting the bar code into an XML document.

3. The method of claim 1 further comprising including element data and attribute data in the document.

4. The method of claim 1 further comprising creating a document type definition program to restrict collecting of element data and attribute data to collecting valid element data and valid attribute data.

5. The method of claim 1 further comprising importing a document type definition program to guide collecting element data and attribute data.

6. A system for tracking a vehicle inventory, the system comprising:

means for providing each vehicle with a two-dimensional markup language-tagged bar code, the bar code including vehicle information;

means for scanning the bar code to generate bar code data;

means for preparing a markup language document using the bar code data; and means for creating an XML schema to guide collecting of element data and attribute data for use in the markup language document.

7. The system of claim 6 further comprising means for converting the bar code into an XML document.

8. The system of claim 6 further comprising means for including element data and attribute data in the document.

9. The system of claim 6 further comprising means for creating a document type definition program to restrict collecting of element data and attribute data to collecting valid element data and valid attribute data.

10. The system of claim 6 further comprising means for importing a document type definition program to guide collecting element data and attribute data.

\* \* \* \* \*